(12) United States Patent
Kim et al.

(10) Patent No.: US 11,498,501 B2
(45) Date of Patent: Nov. 15, 2022

(54) VOICE RECOGNITION FUNCTION LINK CONTROL SYSTEM AND METHOD OF VEHICLE

(71) Applicants: HYUNDAI MOTOR COMPANY, Seoul (KR); KIA MOTORS CORPORATION, Seoul (KR)

(72) Inventors: Dong Uk Kim, Incheon (KR); Jeong Won Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 658 days.

(21) Appl. No.: 16/534,219

(22) Filed: Aug. 7, 2019

(65) Prior Publication Data
US 2020/0189501 A1    Jun. 18, 2020

(30) Foreign Application Priority Data
Dec. 14, 2018  (KR) .................. 10-2018-0161541

(51) Int. Cl.
| | | |
|---|---|---|
| *B60R 16/037* | (2006.01) | |
| *H04M 11/00* | (2006.01) | |
| *G10L 15/07* | (2013.01) | |
| *G08G 1/01* | (2006.01) | |
| *G01C 21/36* | (2006.01) | |
| *B60R 11/02* | (2006.01) | |

(Continued)

(52) U.S. Cl.
CPC ...... *B60R 16/0373* (2013.01); *B60R 11/0217* (2013.01); *B60R 11/0247* (2013.01); *G01C 21/3661* (2013.01); *G08G 1/0141* (2013.01); *G08G 1/0145* (2013.01); *G10L 15/07* (2013.01); *G10L 15/22* (2013.01); *H04M 11/007* (2013.01); *B60R 2011/0003* (2013.01); *G10L 2015/223* (2013.01); *G10L 2015/227* (2013.01)

(58) Field of Classification Search
CPC ............ B60R 16/0373; B60R 11/0217; B60R 11/0247; B60R 2011/0003; B60R 2011/0012; B60R 16/023; B60R 2011/0007; B60R 2011/0021; B60R 2011/0043; G01C 21/3661; G08G 1/0141; G08G 1/0145; G10L 15/07; G10L 15/22; G10L 2015/223; G10L 2015/227; H04M 11/007; G06N 3/02; G06Q 50/10; G06Q 50/30
USPC ....................................................... 701/117
See application file for complete search history.

(56) References Cited

U.S. PATENT DOCUMENTS

| | | | | |
|---|---|---|---|---|
| 8,880,323 B2 * | 11/2014 | Jain | ....................... | G08G 1/0104 702/6 |
| 10,055,093 B2 * | 8/2018 | Shim | ....................... | B60K 35/00 |
| 10,580,405 B1 * | 3/2020 | Wang | ....................... | G06F 3/167 |

(Continued)

*Primary Examiner* — Thuykhanh Le
(74) *Attorney, Agent, or Firm* — Morgan, Lewis & Bockius LLP

(57) ABSTRACT

A voice recognition function link control system of a vehicle, which is configured for mounting a smart speaker used in the home or office in the vehicle and utilizing the smart speaker in linkage with an infotainment system of the vehicle, includes a traffic management system server, an infotainment system, a content service provider system server, and a smart speaker for receiving and transmitting a voice command of any user to the content service provider system server, receiving specific content from the content service provider system server, and outputting the received specific content.

11 Claims, 6 Drawing Sheets

(51) Int. Cl.
  *G10L 15/22*  (2006.01)
  *B60R 11/00*  (2006.01)

(56) References Cited

U.S. PATENT DOCUMENTS

| | | | | |
|---|---|---|---|---|
| 10,638,166 B2* | 4/2020 | Chen | ................ | H04N 21/2223 |
| 10,911,840 B2* | 2/2021 | Goel | ................ | G06F 16/43 |
| 11,217,101 B2* | 1/2022 | Laetz | ................ | G06Q 10/02 |
| 11,294,265 B2* | 4/2022 | Sato | ................ | G06V 40/168 |
| 2002/0003571 A1* | 1/2002 | Schofield | ................ | B60S 1/0885 |
| | | | | 348/148 |
| 2003/0117728 A1* | 6/2003 | Hutzel | ................ | B60R 1/12 |
| | | | | 359/850 |
| 2007/0032912 A1* | 2/2007 | Jung | ................ | B60K 37/06 |
| | | | | 701/1 |
| 2008/0262839 A1* | 10/2008 | Nonaka | ................ | G01C 21/3608 |
| 2009/0328146 A1* | 12/2009 | Lee | ................ | G06F 21/45 |
| | | | | 726/3 |
| 2013/0254798 A1* | 9/2013 | Kim | ................ | H04N 21/4348 |
| | | | | 725/32 |
| 2014/0195110 A1* | 7/2014 | Kim | ................ | G01C 21/3697 |
| | | | | 701/36 |
| 2014/0323039 A1* | 10/2014 | Hong | ................ | H04M 1/6091 |
| | | | | 455/39 |
| 2015/0094897 A1* | 4/2015 | Cuddihy | ................ | H04N 21/41422 |
| | | | | 701/23 |
| 2016/0082867 A1* | 3/2016 | Sugioka | ................ | B60N 2/919 |
| | | | | 701/49 |
| 2016/0101733 A1* | 4/2016 | Yoon | ................ | B60R 1/00 |
| | | | | 348/148 |
| 2016/0203717 A1* | 7/2016 | Ginsberg | ................ | G08G 1/096883 |
| | | | | 701/117 |
| 2017/0146362 A1* | 5/2017 | Bai | ................ | G01C 21/3492 |
| 2017/0214980 A1* | 7/2017 | Nadler | ................ | H04N 21/2543 |
| 2018/0035137 A1* | 2/2018 | Chen | ................ | H04N 21/2743 |
| 2018/0234261 A1* | 8/2018 | Choi | ................ | G06F 3/167 |
| 2018/0308480 A1* | 10/2018 | Jang | ................ | G06F 3/167 |
| 2018/0335908 A1* | 11/2018 | Kim | ................ | G06F 3/0484 |
| 2019/0014370 A1* | 1/2019 | Weber | ................ | H04N 21/438 |
| 2019/0268083 A1* | 8/2019 | Cho | ................ | H04W 4/23 |
| 2019/0274015 A1* | 9/2019 | Surnilla | ................ | H04W 76/30 |
| 2019/0388785 A1* | 12/2019 | Kumar | ................ | A63F 13/54 |
| 2020/0092649 A1* | 3/2020 | Sakurai | ................ | G06V 20/597 |
| 2020/0098032 A1* | 3/2020 | August | ................ | G06F 16/24578 |
| 2020/0114931 A1* | 4/2020 | Rao | ................ | G06V 40/70 |
| 2020/0137148 A1* | 4/2020 | Segal | ................ | H04N 21/222 |
| 2020/0402089 A1* | 12/2020 | Zhang | ................ | G06Q 30/01 |
| 2021/0004732 A1* | 1/2021 | Wang | ................ | H04W 4/029 |
| 2021/0035583 A1* | 2/2021 | Park | ................ | G06F 3/16 |
| 2021/0120509 A1* | 4/2021 | Price | ................ | H04R 3/12 |
| 2021/0146881 A1* | 5/2021 | Troia | ................ | G06Q 10/02 |
| 2021/0306742 A1* | 9/2021 | Saito | ................ | H04R 3/12 |
| 2021/0368559 A1* | 11/2021 | Guo | ................ | G10L 15/22 |

* cited by examiner

VOICE RECOGNITION FUNCTION LINK CONTROL SYSTEM AND METHOD OF VEHICLE

This application claims the benefit of priority to Korean Patent Application No. 10-2018-0161541, filed on Dec. 14, 2018 in the Korean Intellectual Property Office, the entire content of which is incorporated herein by reference.

TECHNICAL FIELD

The present disclosure relates to a voice recognition function link control system and method of a vehicle and, more particularly, to a voice recognition function link control system and method of a vehicle, which are capable of mounting and utilizing a smart speaker used in the home or office in the vehicle.

BACKGROUND

In general, an advanced traffic management system (ATMS) is a part of an intelligence traffic system (ITS), and refers to a system for collecting traffic information using an information collection device and providing the traffic information to media such as smartphones and navigation systems. In particular, the ATMS has been introduced into urban arterial roads linked to highways or national highways in order to provide traffic information services. The ATMS collects traffic information through vehicle detectors or surveillance camera on roads and provides a variety of collected information (events, traffic accidents, traffic, etc.) to variable message signs (VMSs) and navigation devices or smartphones of drivers. Therefore, the drivers may select optimal routes.

Meanwhile, speakers used to listen to music or radio have evolved with recognition technology. Speakers are transforming from devices for transmitting sound into smart speakers (artificial intelligence (AI) speakers) that think and manage using voice recognition technology which is easily accessible in smartphones and cloud and AI technology. Not only global IT companies such as Amazon (Alexa), Google (OK Google) and Apple but also domestic companies such as SK Telecom (Nugu), KT (GiGA Genie), Naver and Samsung Electronics are already serving corresponding products in this market.

However, in the present technology, since the smart speakers or the AI speakers are used only in the home or office where the Internet is provided, when any user mounts a smart speaker in a vehicle, the user has used only some content or services using a short-range communication function (Wi-Fi hot spot) of the smartphone of the user. In addition, since the roles of a speaker originally mounted in the vehicle and the smart speaker mounted in the vehicle by the user are not defined, there is a limitation in efficient use of the smart speaker in the vehicle.

SUMMARY

Accordingly, the present disclosure is directed to a voice recognition function link control system and method of a vehicle that substantially obviate one or more problems due to limitations and disadvantages of the related art.

An objective of the present disclosure is to provide a voice recognition function link control system and method of a vehicle, which are capable of mounting a smart speaker used in the home or office in the vehicle and utilizing the smart speaker in linkage with an infotainment system of the vehicle.

Additional advantages, objectives, and features of the present disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the present disclosure, as embodied and broadly described herein, a voice recognition function link control system of a vehicle includes a traffic management system server 100 configured to collect traffic information through at least one information collection device, to store and manage the traffic information in a database, and to transmit the traffic information to a pre-registered vehicle according to a request of a pre-registered user or a predetermined traffic information provision command of the user, an infotainment system 200 configured to receive the traffic information from the traffic management system server 100 and to control output of a traffic signal in a form of an audio signal inside the vehicle or output of the traffic information in a form of an audio signal and a video signal according to a content of the traffic information, a content service provider system server 300 configured to store and manage a variety of content corresponding to each artificial intelligence package in a database through a predetermined machine learning scheme in a state in which at least one artificial intelligence package (model) is installed, wherein an artificial neural network is applied to the at least one artificial intelligence package, and the content service provider system server 300 is further configured to provide a specific content among the variety of content according to a voice command of the pre-registered user or one or more predetermined service options, to transmit a content related to the traffic information among the variety of content to the traffic management system server 100 or to receive a content from the traffic management system server 100; and a smart speaker 400 configured to receive and transmit a voice command of any user to the content service provider system server 300, to receive the specific content from the content service provider system server 300, and to output the received specific content. When the infotainment system 200 determines that the voice command of the user is located on a rear seat of the vehicle or the smart speaker is located in a front seat of the vehicle, the smart speaker 400 extracts uttered voice of the voice command of the user and recognizes a specific content or a service requested by the user.

In another aspect of the present disclosure, a voice recognition function link control method of a vehicle having an infotainment system and a smart speaker mounted therein includes requesting, by a user located inside the vehicle, specific content or a service (S101), determining whether a smart speaker mounted inside the vehicle is located in a front seat of the vehicle (S103), determining whether a person who has requested the specific content or the service is located on a rear seat of the vehicle upon determining that the smart speaker is not located in the front seat of the vehicle (S105), determining whether the person is located on a left or right seat of the rear seat of the vehicle upon determining that the person is located on the rear seat of the vehicle (S107), the infotainment system provided in the vehicle setting a current sound feedback mode to any one selected from among a plurality of predetermined conditions when the person is located on a left or right side of the rear seat of the vehicle (S121 to S133), determining, by the smart speaker, whether a current mode is a navigation mode, a media mode, or a call mode upon determining that the person is not located on the rear seat of the vehicle or the smart speaker is located in the front seat of the vehicle (S109), determining whether one of a plurality of general speakers respectively mounted in the front and rear seats of the vehicle is playable upon determining that the current mode is any one of the navigation mode, the media mode, or the call mode (S111), and extracting, by the smart speaker, an uttered voice of the user when any one of the general speakers is playable, and recognizing the specific content or the service requested by the user upon determining that the current mode is a mode other than the navigation mode, the media mode, or the call mode or when any one of the general speakers respectively mounted in the front and rear seats of the vehicle is not playable (S115).

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the inventive concept(s) and are incorporated in and constitute a part of this application, illustrate embodiment(s) of the invention and together with the description serve to explain the principle of the present disclosure.

DETAILED DESCRIPTION

Figure 1:
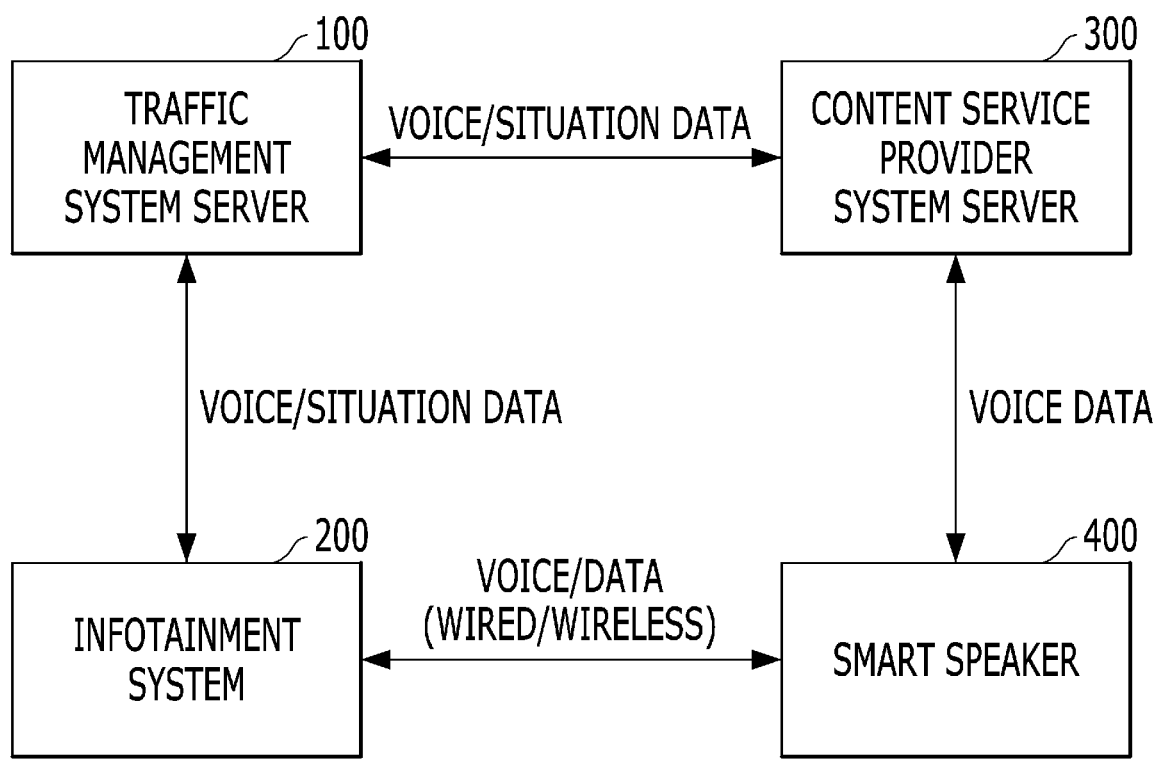
FIG. 1 is a block diagram showing the configuration of a voice recognition function link control system of a vehicle according to an exemplary embodiment of the present disclosure.

Hereinafter, various exemplary embodiments of the present disclosure will be described in detail with reference to the accompanying drawings so as to be easily implemented by those skilled in the art. However, the present disclosure may be variously implemented and is not limited to the embodiments described herein. In the drawings, in order to clearly describe the present disclosure, portions which are not related to the description of the present disclosure will be omitted and similar portions are denoted by similar reference numerals throughout the specification.

In the entire specification, when a certain portion "includes" a certain component, this indicates that other components are not excluded, but may be further included unless specially described. The terms "unit", "-or/er" and "module" described in the specification indicate a unit for processing at least one function or operation, which may be implemented by hardware, software or a combination thereof.

Hereinafter, the configuration and operation of a voice recognition function link control system of a vehicle applicable to various exemplary embodiments of the present disclosure will be described in detail with reference to FIGS. 1 to 4.

Figure 2:
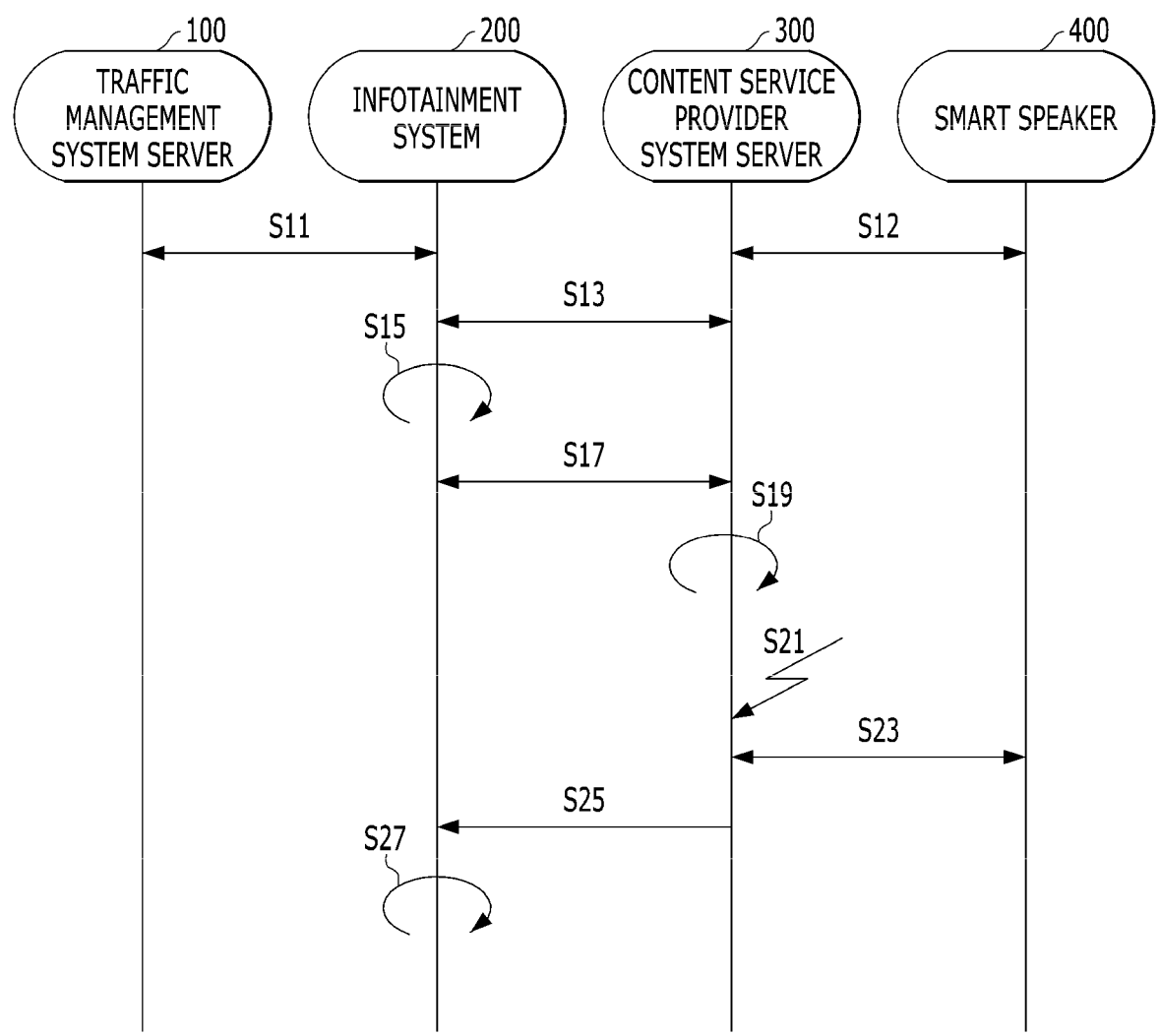
FIG. 2 is a view illustrating data flow between components in a voice recognition function link control system of a vehicle according to an exemplary embodiment of the present disclosure.

FIG. 1 is a block diagram showing the configuration of a voice recognition function link control system of a vehicle according to the present disclosure, and FIG. 2 is a view illustrating data flow between components in a voice recognition function link control system of a vehicle according to the present disclosure.

Referring to FIG. 1, the voice recognition function link control system of the vehicle includes a traffic management system server 100 for collecting traffic information through at least one information collection device, storing and managing the traffic information in a database and transmitting the traffic information to a pre-registered vehicle according to a request of a pre-registered user or a predetermined traffic information provision command of the user; an infotainment system 200 for receiving the traffic information from the traffic management system server 100 and controlling output of the traffic signal in the form of an audio signal inside the vehicle or output of the traffic information in the form of an audio signal and a video signal according to the content of the traffic information; a content service provider system server 300 for storing and managing a variety of content corresponding to each artificial intelligence package in a database through a predetermined machine learning scheme in a state in which at least one artificial intelligence package (model), to which an artificial neural network is applied, is installed, providing specific content among the variety of stored content according to a voice command of the pre-registered user or one or more predetermined service options, transmitting content related to the traffic information among the variety of stored content to the traffic management system server 100 or receiving content from the traffic management system server 100; and a smart speaker 400 for receiving and transmitting a voice command of any user to the content service provider system server 300, receiving specific content from the content service provider system server 300, and outputting the received specific content.

The term 'server' of the traffic management system server 100 or the content service provider system server 300, according to an exemplary embodiment of the present disclosure, may be a hardware device (e.g., processor) that provides functionality for programs or a program executed by a processor, called "clients", in an architecture of a client-server model.

The infotainment system 200 according to an exemplary embodiment of the present disclosure may be a processor (e.g., computer, microprocessor, CPU, ASIC, circuitry, logic circuits etc.). The infotainment system 200 may be implemented by a non-transitory memory storing, e.g., a program(s), software instructions reproducing algorithms, etc., which, when executed, controls operations of various components of the voice recognition function link control system of the vehicle, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The smart speaker 400 is detachably mounted inside the vehicle, and the infotainment system 200 and the smart speaker 400 may be connected using short-range wireless communication technology selected from between Bluetooth or NFC when the smart speaker is mounted inside the vehicle.

In addition, the infotainment system 200 may select and perform an audio mode in which only an audio signal is output or a video mode in which an audio signal and a video signal are simultaneously output according to specific content transmitted from the traffic management system server 100 or the smart speaker 400.

When the specific content is output in the form of an audio signal, sound feedback may be controlled according to the mode of the infotainment system 200, the playable state of general speakers mounted in the front and rear seats of the vehicle, a position where the user utters a request, and priorities of the request and a vehicle function according to a request of the infotainment system 200.

In addition, the smart speaker 400 may be mounted in one of the driver's seat and the passenger seat belonging to the front seat of the vehicle and the left and right seats belonging to the rear seat of the vehicle using reflected sound of an audio signal output for a predetermined time through first to fourth speakers mounted in the front and rear seats of the vehicle.

In addition, when a USIM card is not installed in the smart speaker 400, the smart speaker 400 and the infotainment system 200 may be connected using a Wi-Fi hot spot function of any smartphone located inside the vehicle.

In addition, the smart speaker 400 may be detachably mounted in a stand mounted in a cup holder or a storage box disposed in the front seat of the vehicle or may be mounted in a cup holder, a storage box, an armrest or a center console disposed in the front seat of the vehicle, a rear center console disposed in the rear seat of the vehicle, or left and right door portions arranged at both sides of the rear seat.

In addition, the infotainment system 200 and the smart speaker 400 may be connected using a modem installed in the vehicle in a state in which a media mode is set to a Bluetooth (BT) mode or a Wi-Fi hot spot function of any smartphone located inside the vehicle.

FIG. 2 is a view illustrating data flow between components in a voice recognition function link control system of a vehicle according to the present disclosure.

Referring to FIG. 2, the traffic management system server 100, the infotainment system 200, the content service provider system server 300 and the smart speaker 400 are connected through an existing wireless communication service network in advance (S11 and S12).

At this time, when the smart speaker 400 used by the user in the home or office is detachably located inside the vehicle and then is physically connected to the infotainment system 200, the infotainment system 200 and the smart speaker 400 are connected to each other to perform data communication using a Bluetooth function as a short-range wireless communication method (S13).

At this time, the infotainment system 200 determines a sound feedback mode according to received content or the content of a service (S17), and the smart speaker 400 is connected to the infotainment system 200 according to the determined sound feedback mode to perform data communication (S19).

At this time, when the user utters a request through a wakeup command, the smart speaker 400 recognizes the content of the utterance (S21) and requests the recognized content from the content service provider system server 300, and the content service provider system server 300 provides content or a service corresponding to the request of the smart speaker 400 (S23).

Then, the smart speaker 400 transmits the specific content or service received from the content service provider system server 300 to the infotainment system 200 of the vehicle (S25), and the content or service is played through a speaker or display mounted inside the vehicle under control of the infotainment system 200 (S27).

Hereinafter, the control procedure of the voice recognition function link control system of the vehicle according to an exemplary embodiment of the present disclosure will be described with reference to FIGS. 3 and 4.

Figure 3:
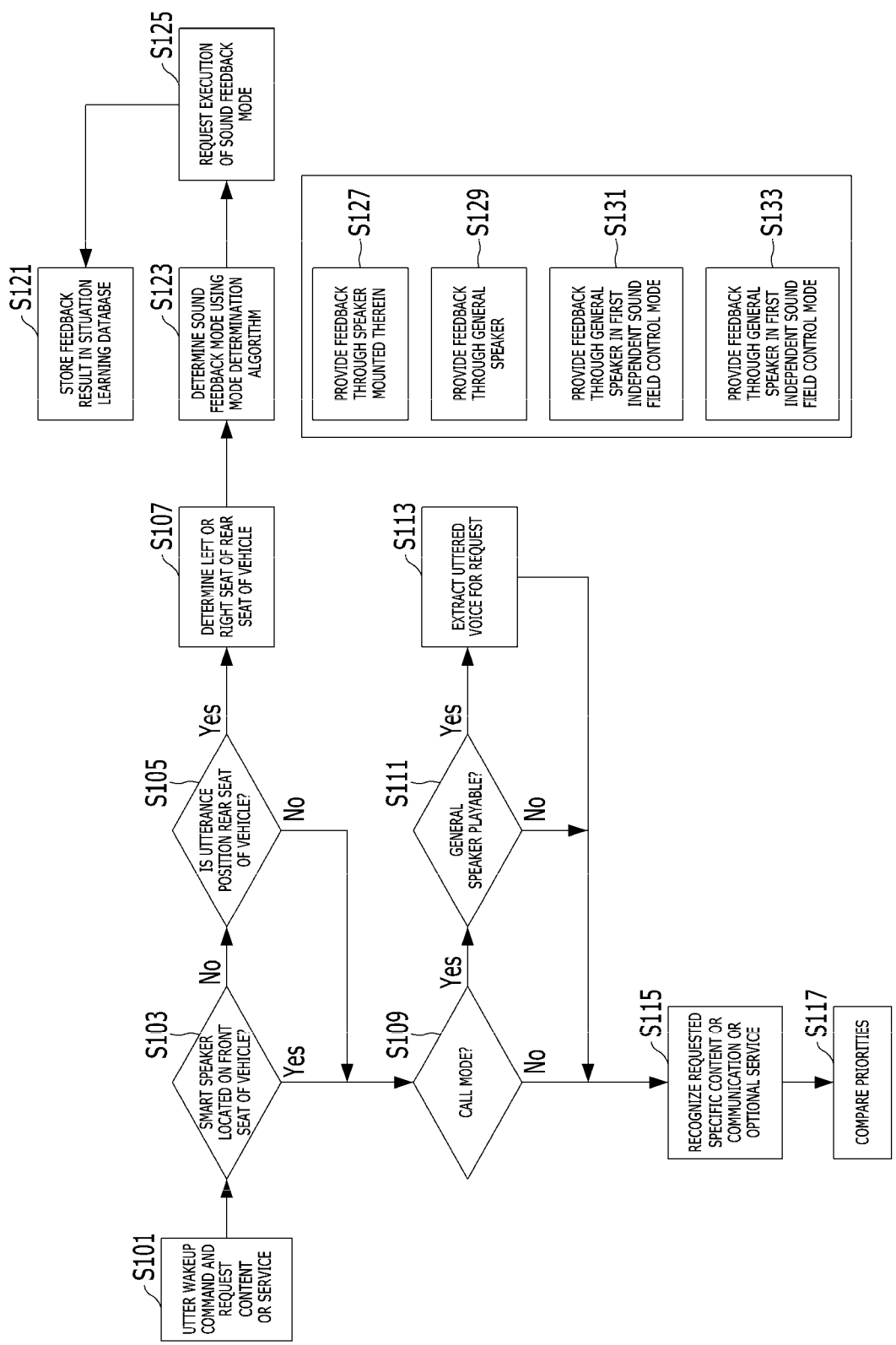
FIGS. 3 and 4 are flowcharts illustrating a link control method of a voice recognition function of a vehicle according to an exemplary embodiment of the present disclosure.

First, referring to FIG. 3, a driver or a passenger located inside the vehicle utters a predetermined specific wakeup command and requests specific content or a communication or optional service (S101).

At this time, the infotainment system 200 determines whether the smart speaker 400 is located in the front seat of the vehicle through the reflected sound of an audio signal output for a certain time (S103).

Upon determining that the smart speaker 400 is not located at the front seat of the vehicle in step S103, whether a person who has requested the specific content or communication or optional service is located on the rear seat of the vehicle is determined (S105).

Upon determining that the person is located on the rear seat of the vehicle in step S105, whether the person is located on the left seat or the right seat of the rear seat of the vehicle is determined (S107).

The infotainment system 200 sets the current sound feedback mode to any one selected from among a plurality of predetermined conditions S127 to S133 according to the result of determination of step S107 (S123).

That is, as shown in FIG. 3, the infotainment system 200 determines the sound feedback mode of the smart speaker 400 using a mode determination algorithm installed therein (S123), and the smart speaker 400 may request execution of the sound feedback mode determined with respect to the user from the content service provider system server 300 (S125). At this time, the smart speaker 400 may store and manage the feedback result in a situation learning database provided by the user in the past (S121).

At this time, the smart speaker 400 may feed back and provide the content or service through a speaker mounted therein (S127), may feed back and provide the content or service through the first to fourth general speakers respectively provided in the front and rear seats through data communication between the smart speaker 400 and the infotainment system 200 (S129), may feed back and provide the content or service through a general speaker mounted inside the vehicle in a first independent sound field control mode through data communication between the smart speaker 400 and the infotainment system 200 (S131), or may feed back and provide the content or service through a general speaker mounted inside the vehicle in a second independent sound field control mode through data communication between the smart speaker 400 and the infotainment system 200.

Meanwhile, as shown in FIG. 3, upon determining that the smart speaker 400 is located in the front seat of the vehicle in step S103 or upon determining that the person is located on the front seat in step S105, the smart speaker 400 determines whether a current mode is any one of a navigation mode, a media mode, or a call mode (S109).

Upon determining that the current mode is any one of a navigation mode, a media mode, or a call mode in step S109, whether one of the plurality of general speakers (not shown) respectively mounted in the front and rear seats of the vehicle is playable is determined (S111).

Upon determining that one of the plurality of general speakers (not shown) respectively mounted in the front and rear seats of the vehicle is playable in S111, the smart speaker 400 extracts the uttered voice for the request (S113). At this time, the smart speaker 400 may distinguish between the uttered voice and external sound (navigation guidance sound, vehicle noise, and external noise of the vehicle) and extract only the voice signal of the person.

Subsequently, the smart speaker 400 recognizes the specific content or the communication or optional service requested in step S101 (S115), when the voice signal is extracted, upon determining that the current mode is a mode other than the navigation mode, the media mode, or the call mode in step S109, or upon determining that one of the plurality of general speakers respectively mounted in the front and rear seats of the vehicle is not playable in S111.

Subsequently, the smart speaker 400 compares the priorities between the request of the user and the vehicle function (S117) when there is a vehicle function requested by the infotainment system 200 or the content service provider system server 300 in addition to the specific content or the communication or optional service requested in step S101, and the smart speaker 400 determines the sound feedback mode of the smart speaker 400 using the mode determination algorithm installed therein (S123) according to the result of comparison step in S117.

Figure 4:
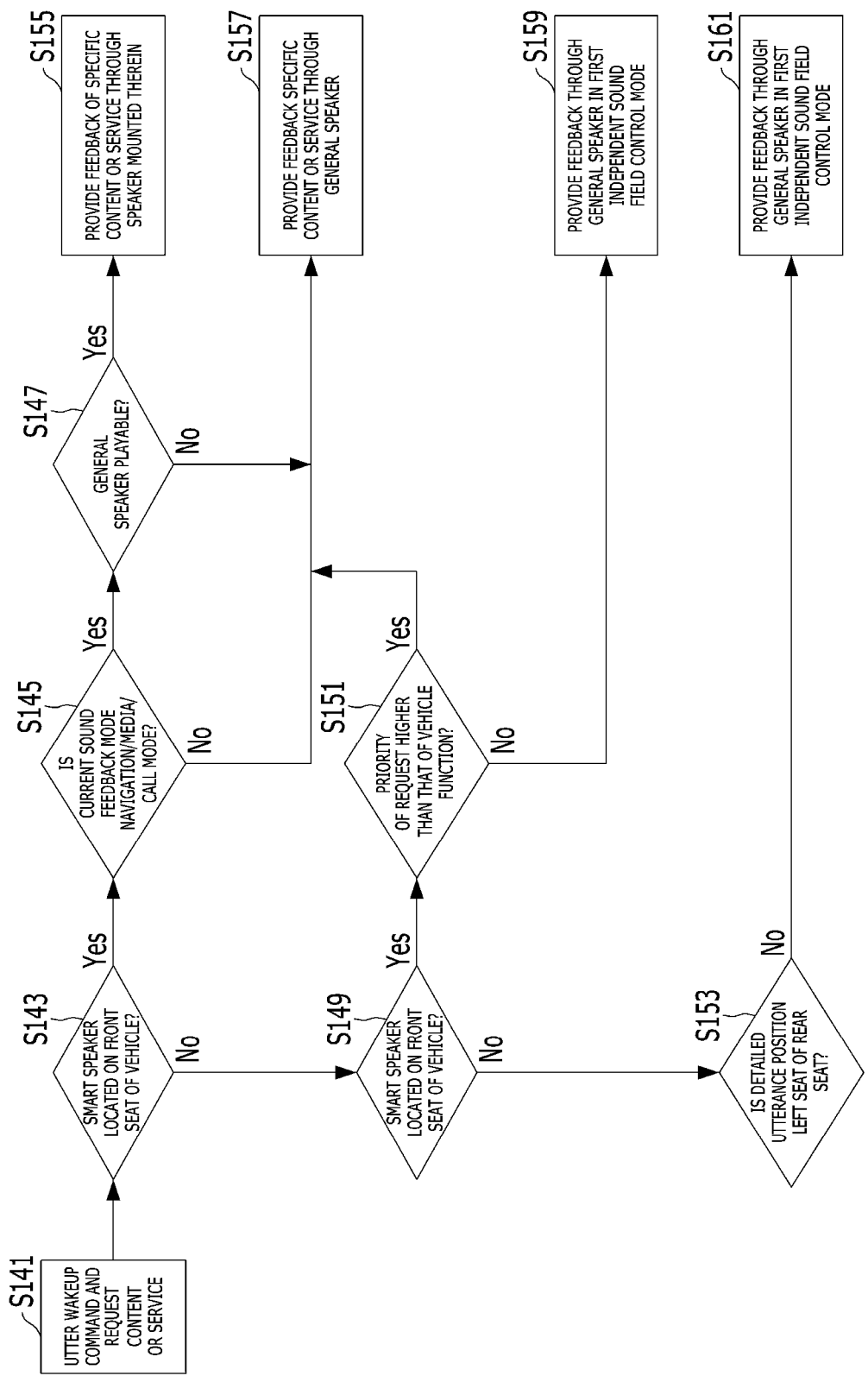

Moreover, referring to FIG. 4, when the driver or passenger located inside the vehicle utters a predetermined specific wakeup command and requests specific content or a communication or optional service (S141).

At this time, the infotainment system 200 determines whether the smart speaker 400 is located in the front seat of the vehicle through the reflected sound of an audio signal output for a certain time (S143).

Upon determining that the smart speaker 400 is located at the front seat of the vehicle in step S143, the infotainment system 200 determines whether a current sound feedback mode is one of a navigation mode, a media mode, or a call mode (S145).

Upon determining that the current mode is any one of the navigation mode, the media mode, or the call mode in step S145, whether one of the plurality of general speakers (not shown) respectively mounted in the front and rear seats of the vehicle is playable is determined (S147).

Upon determining that one of the plurality of general speakers (not shown) respectively mounted in the front and rear seats of the vehicle is playable in S147, the smart speaker 400 provides feedback of the specific content or service provided by the content service provider system server 300 through the speaker mounted therein (S155).

However, upon determining that the current mode is a mode other than the navigation mode, the media mode, or the call mode in step S145 or upon determining that one of the plurality of general speakers respectively mounted in the front and rear seats of the vehicle is not playable in S147, feedback of the specific content or service is provided through the first to fourth general speakers (not shown) respectively mounted in the front and rear seats of the vehicle through data communication between the smart speaker 400 and the infotainment system 200 (S157).

However, upon determining that the smart speaker 400 is not located at the front seat of the vehicle in step S143, the smart speaker 400 determines whether the utterance position of the specific wakeup command is the front seat of the vehicle (S149).

Upon determining that the utterance position of the specific wakeup command is the front seat of the vehicle in step S149, the smart speaker 400 determines whether the priority of the request of the user is higher than that of the vehicle function (S151).

Upon determining that the priority of the request of the user is higher than that of the vehicle function in step S151, step S157 of providing feedback of the specific content or service through the first to fourth general speakers respectively mounted in the front and rear seats of the vehicle through data communication between the smart speaker 400 and the infotainment system 200 is performed.

However, upon determining that the priority of the request of the user is lower than that of the vehicle function in step S151, feedback of the specific content or service is provided in a first independent sound field control mode using the general speaker mounted inside the vehicle through data communication between the smart speaker 400 and the infotainment system 200 (S159).

Upon determining that the utterance position of the specific wakeup command is the rear seat of the vehicle in step S149, whether the detailed utterance position of the specific wakeup command is the left seat or the right seat of the rear seat (S153) and feedback of the specific content or service is provided in a second independent sound field control mode using the general speaker mounted inside the vehicle through data communication between the smart speaker 400 and the infotainment system 200 according to the result of determination (S161).

In the above-described voice recognition function link control procedure of the vehicle according to an exemplary embodiment of the present disclosure, when the user makes a request, as shown in Table 1 below, feedback on the request of the user may be reproduced using the smart speaker 400 only when the infotainment system 200 is in a navigation mode, a media mode, or a call mode and the general speaker mounted inside the vehicle is playable.

TABLE 1

| Division | Speaker position | Infotainment state | Vehicle sound | Speaker sound | Note |
| --- | --- | --- | --- | --- | --- |
| Front-seat traveling assistance | Front seat | Navigation + media | Media reproduction | Notification sound/navigation sound | Available in a state of being integrated with microphone of vehicle |
| Front-seat passenger | Front seat | Navigation + media | Notification sound/navigation sound (media) | Separate media | Sound auto control of each speaker |
| Child care | — | Navigation + media | Silence | Notification sound/navigation sound (media) | |

TABLE 1-continued

| Division | Speaker position | Infotainment state | Vehicle sound | Speaker sound | Note |
|---|---|---|---|---|---|
| Control dedicated to rear seat | Rear seat | Navigation + media | Normal | Normal or notification sound/navigation sound | Transmission of command of rear seat to infotainment |
| Rear-seat media | Rear seat | Navigation + media | Normal | Separate media | Sound auto control of each speaker |

Figure 5:
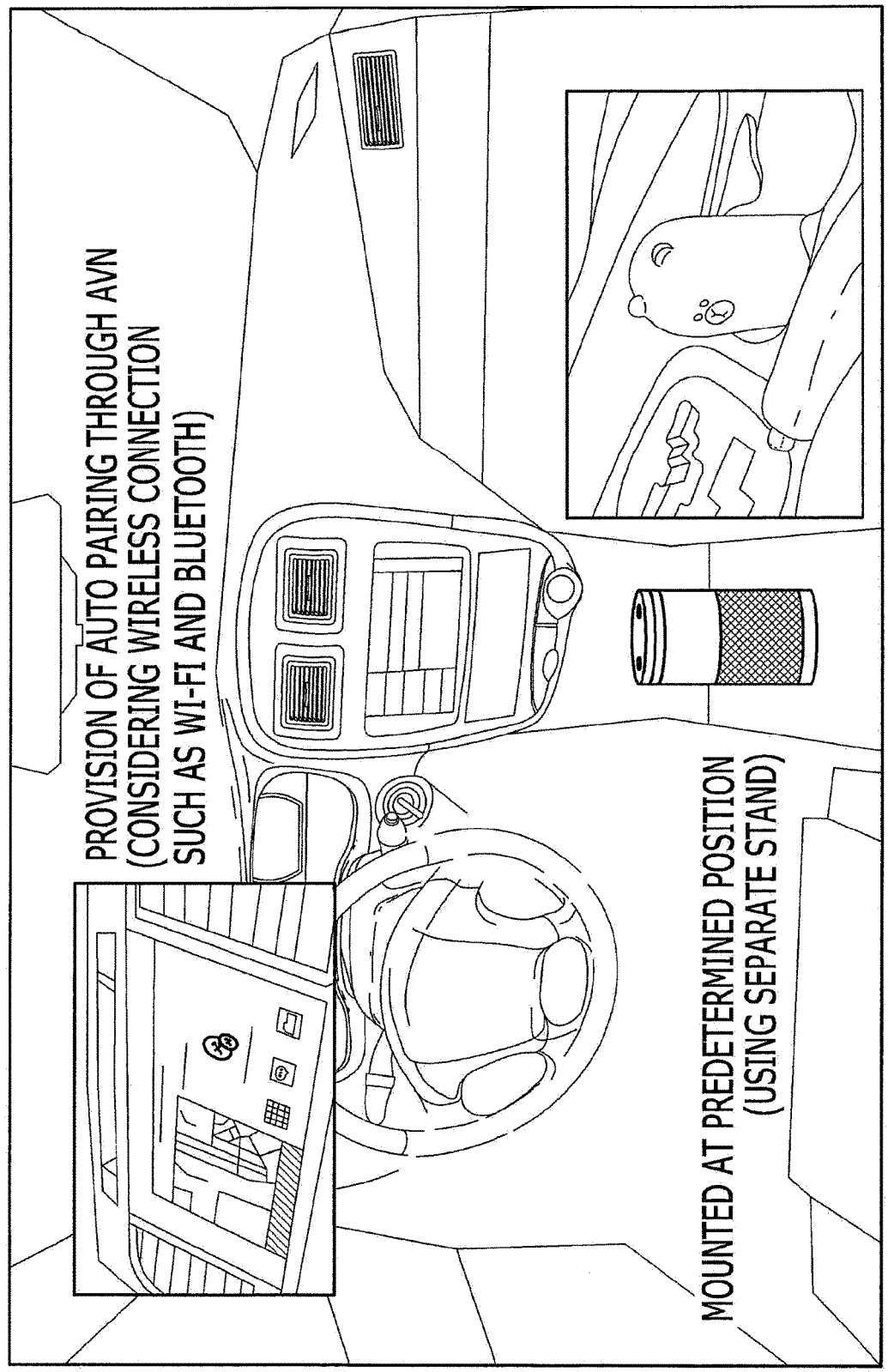
FIGS. 5 and 6 are views illustrating embodiments of a voice recognition function link control system of a vehicle according to an exemplary embodiment of the present disclosure.
Figure 6:
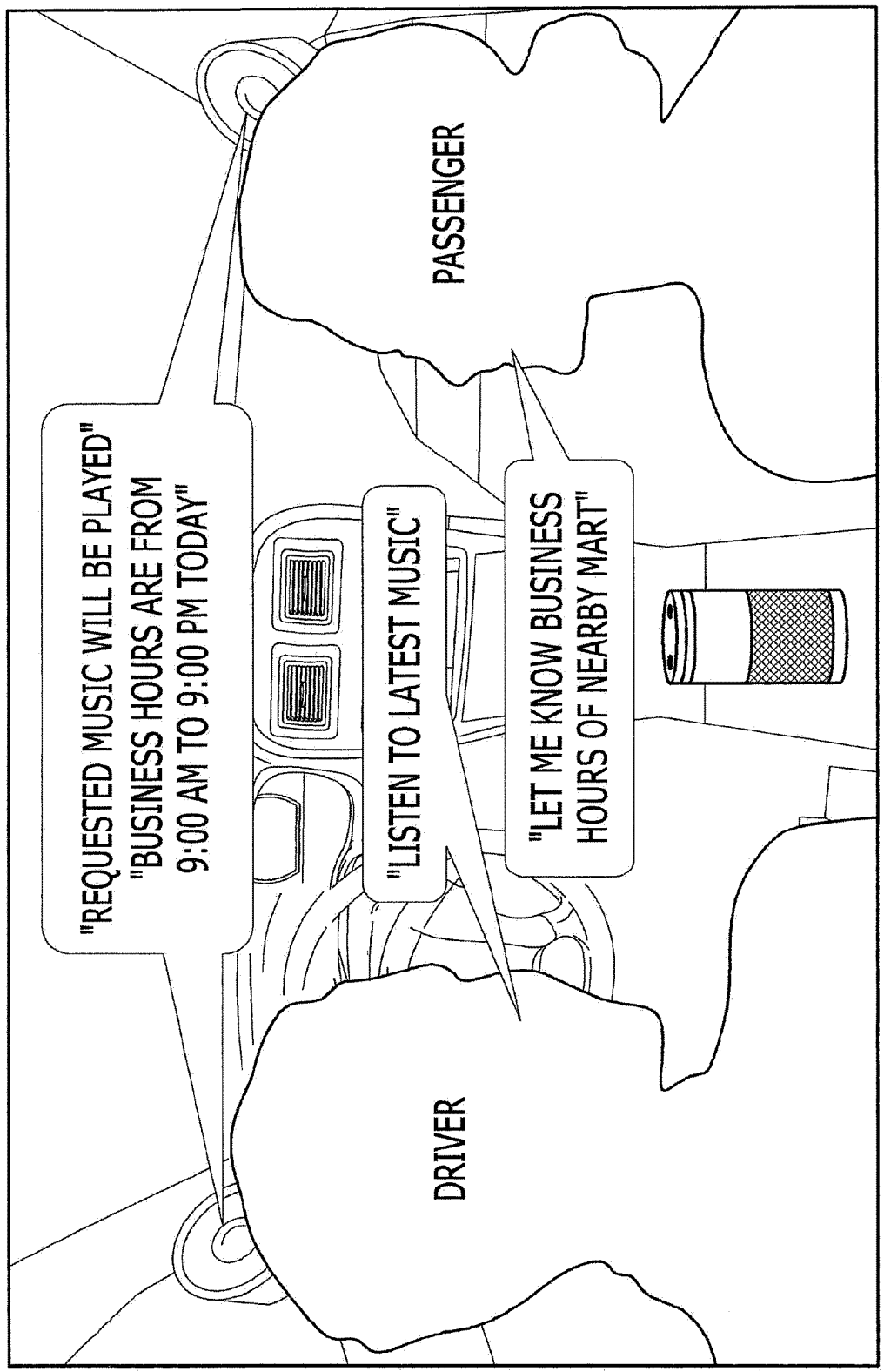

According to the above-described voice recognition function link control system and method of the vehicle of an exemplary embodiment of the present disclosure, as shown in FIGS. 5 and 6, the smart speaker 400 used by the user in the home or office is mounted inside the vehicle and is linked to the infotainment system 200 of the vehicle to use or receive external content or a service provided by the content service provider system server 300. FIG. 5 shows the case where the smart speaker 400 is automatically paired when the vehicle starts in a state in which the smart speaker is mounted inside the vehicle, and FIG. 6 shows the case where users request desired content or services from the content service provider system server 300 using a speaker voice recognition function.

In exemplary embodiments of the present disclosure, an artificial intelligence service performed by the content service provider system server 300 and the smart speaker 400 is roughly divided into 13 basic functions (personal schedule management, social service management, foreign language translation, execution of a specific app and service, shopping, email management, message management, music management, weather information provision, travel information provision, sports event notification, answer to question and chat, Internet of things control, etc.), a screen utilization function of an intertainment system for providing feedback through a display mounted inside the vehicle in addition to an audio signal when a voice recognition device is used, a basic link function between the vehicle and a speaker, which enables a separate link mode using a Bluetooth (BT) multi-connection method, a vehicle sound system link function for reproducing specific content and feedback of a speaker through sound output inside the vehicle, a vehicle microphone link function for using speaker voice recognition through a microphone mounted in the vehicle, a vehicle control link function for transmitting a voice control command from a speaker to a vehicle system, and a vehicle data plan link function for using a model of the vehicle using Wi-Fi hot spot.

Here, the personal schedule management function refers to a function for enabling an artificial intelligence algorithm to output an alarm to a device such as a smartphone based on information input to a calendar app and a service to continue the schedule without any trouble. In addition, the personal schedule management function may provide a service for proposing an optimal way to move to an appointment place not to be late for appointment. Recently, a service for enabling the artificial intelligence algorithm to analyze the behavior pattern of a user and to notify the user of a plan which is not written in the calendar by mistake has been introduced.

The social service management function refers to a function for enabling the artificial intelligence algorithm to collect and show articles, photos, videos on Facebook, Twitter and Instagram of the user in a single place. In addition, a function for searching for articles, photos, videos which are hot topics on social services is also provided. Recently, a function for enabling the artificial intelligence algorithm to analyze user's interests and to find out what the user is interested in has been added.

The foreign language translation function provides a function for receiving and automatically translating a foreign language into a language used by a user. The artificial intelligence algorithm may provide simultaneous translation when a user talks with a foreigner.

The function for executing the specific app and service provides a function for finding and automatically executing a specific app and service in a device when a user instructs execution of the specific app and service by voice. Recently, a function for operating all functions of the app and service by voice in addition to execution of the app and service has been provided.

The shopping function provides a function for enabling the artificial intelligence algorithm to search shopping mall sites to find the lowest price such that a user purchases desired goods at as low a price as possible. In addition, a function for finding a product desired by a user by voice and paying for the product is also provided.

The email management function provides basic functions such as recent email alarm or email reading and advanced functions such as a function for audibly reading a specific email and a function for preparing an email and sending the email by voice. In addition, a function for an artificial intelligence algorithm to analyze the content of the email of a user and to automatically send a simple reply is being studied.

The messenger management function provides a function for checking the content of an instant messenger such as Kakao Talk, Line, Facebook messenger, etc. and sending a replay thereto by voice. A function for continuously sending notification such that a user immediately recognizes a message sent by an intimate friend is also provided. The artificial intelligence algorithm determines how intimate a third party is with the user through message analysis.

The music management function provides a function for enabling the artificial intelligence algorithm to integrate and manage music contained in the device of a user and music provided by an affiliated service (e.g., Spotify or YouTube). The managed music may be played by voice or music having a specific concept may be automatically played at a specific time. For example, the morning bugle is played at 07:00 and classical music may be played at 15:00.

The weather information provision function provides a function for enabling the artificial intelligence algorithm to notify the user of current and future weather information when the user goes out. In addition, a function for notifying the user of the weather at a specific location on a specific date and time using voice or visual data when the user asks about the weather at the specific location on the specific date and time is also provided.

The travel information provision function provides a function for enabling the artificial intelligence algorithm to provide information about a travel destination when a user asks for the information about the travel destination before travel. In addition, a service for finding the best way to get to a travel destination quickly and cheaply and making a reservation is also provided.

The sport event notification function notifies a user of the schedule of a specific sports team and a method of watching a sports event of the specific sports team when the user notifies the artificial intelligence algorithm of the specific sports team.

The answer to question and chat function provides a function for enabling the artificial intelligence algorithm to find the answer to the question of the user through Internet search and notifying the user of the answer. In addition, various common sense, humor, topical UCC, etc. are summarized and shown. Excellent communication ability sufficient to chat with the user is provided.

Recently, the Internet of things control function has been actively included in the artificial intelligence algorithm. In the past, the user directly controlled the Internet of things through a smartphone app. However, currently, the artificial intelligence algorithm analyzes the behavior pattern of the user and autonomously operates the Internet of things such as a smart TV, an air conditioner, a boiler, a CCTV or a refrigerator.

In the voice recognition function link control system and method according to at least one exemplary embodiment of the present disclosure having the above-described configuration, it is possible to mount the smart speaker used in the home or office in the vehicle and utilizing the smart speaker in linkage with the infotainment system of the vehicle. Therefore, the user can selectively use various necessary functions.

In addition, it is possible to provide a sound mode suitable for a situation in consideration of the use characteristics according to the positions of the front and rear seats of the vehicle and the number and characteristics of passengers and to recommend a suitable mode through a use pattern method of the user.

The effects of the present disclosure are not limited to the above-described effects and other effects which are not described herein may be derived by those skilled in the art from the above description of the exemplary embodiments of the present disclosure.

The inventive concept(s) can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, and optical data storage devices.

The above exemplary embodiments are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

What is claimed is:

1. A voice recognition function link control system of a vehicle, comprising:
   a traffic management system server configured to collect traffic information through at least one information collection device, to store and manage the traffic information in a database, and to transmit the traffic information to a pre-registered vehicle according to a request of a pre-registered user or a predetermined traffic information provision command of the user;
   an infotainment system configured to receive the traffic information from the traffic management system server and to control output of a traffic signal in a form of an audio signal inside the vehicle or output of the traffic information in a form of an audio signal and a video signal according to a content of the traffic information;
   a content service provider system server configured to store and manage a variety of content corresponding to each artificial intelligence package in a database through a predetermined machine learning scheme in a state in which at least one artificial intelligence package (model) is installed, wherein an artificial neural network is applied to the at least one artificial intelligence package, and the content service provider system server is further configured to provide a specific content among the variety of content according to a voice command of the pre-registered user or one or more predetermined service options, to transmit a content related to the traffic information among the variety of content to the traffic management system server, or to receive a content from the traffic management system server; and
   a smart speaker configured to receive and transmit a voice command of any user to the content service provider system server, to receive the specific content from the content service provider system server, and to output the received specific content,
   wherein, when the infotainment system determines that the voice command of the user is located on a rear seat of the vehicle or the smart speaker is located in a front seat of the vehicle, the smart speaker extracts uttered voice of the voice command of the user and recognizes a specific content or a service requested by the user,
   wherein, when a current mode is a mode other than a navigation mode, a media mode, or a call mode, or when any one of general speakers respectively mounted in front and rear seats of the vehicle is not playable, the smart speaker extracts the uttered voice, and
   wherein, when the current mode is any one of the navigation mode, the media mode, or the call mode, or when any one of the general speakers is playable, the specific content or the service is recognized.

2. The voice recognition function link control system according to claim 1,
   wherein the smart speaker is detachably mounted inside the vehicle, and
   wherein, when the smart speaker is mounted inside the vehicle, the infotainment system and the smart speaker are connected to each other using Bluetooth.

3. The voice recognition function link control system according to claim 1, wherein the infotainment system selects and performs an audio mode in which only an audio signal is output or a video mode in which an audio signal and a video signal are simultaneously output, according to the specific content transmitted from the traffic management system server or the smart speaker.

4. The voice recognition function link control system according to claim 1, wherein, when an USIM card is not installed in the smart speaker, the smart speaker and the infotainment system may be connected to each other using a Wi-Fi hot spot function of any smartphone inside the vehicle.

5. The voice recognition function link control system according to claim 1, wherein the smart speaker is detachably mounted in a stand mounted in a cup holder or a storage box disposed in a front seat of the vehicle or is mounted in a cup holder, a storage box, an armrest or a center console disposed in the front seat of the vehicle, a rear center console disposed in a rear seat of the vehicle, or left and right door portions arranged at both sides of the rear seat.

6. The voice recognition function link control system according to claim 1, wherein the infotainment system and the smart speaker are connected using a modem installed in the vehicle in a state in which a media mode is set to a Bluetooth (BT) mode, or using a Wi-Fi hot spot function of any smartphone inside the vehicle.

7. A voice recognition function link control system of a vehicle, comprising:
   a traffic management system server configured to collect traffic information through at least one information collection device, to store and manage the traffic information in a database, and to transmit the traffic information to a pre-registered vehicle according to a request of a pre-registered user or a predetermined traffic information provision command of the user;
   an infotainment system configured to receive the traffic information from the traffic management system server and to control output of a traffic signal in a form of an audio signal inside the vehicle or output of the traffic information in a form of an audio signal and a video signal according to a content of the traffic information;
   a content service provider system server configured to store and manage a variety of content corresponding to each artificial intelligence package in a database through a predetermined machine learning scheme in a state in which at least one artificial intelligence package (model) is installed, wherein an artificial neural network is applied to the at least one artificial intelligence package, and the content service provider system server is further configured to provide a specific content among the variety of content according to a voice command of the pre-registered user or one or more predetermined service options, to transmit a content related to the traffic information among the variety of content to the traffic management system server, or to receive a content from the traffic management system server; and
   a smart speaker configured to receive and transmit a voice command of any user to the content service provider system server, to receive the specific content from the content service provider system server, and to output the received specific content,
   wherein the infotainment system selects and performs an audio mode in which only an audio signal is output or a video mode in which an audio signal and a video signal are simultaneously output, according to the specific content transmitted from the traffic management system server or the smart speaker, and
   wherein, when the specific content is output in the form of only the audio signal, sound feedback is controlled according to a mode of the infotainment system, a playable state of whether general speakers respectively mounted in the front and rear seats of the vehicle are playable, a position from which a request of a user is uttered, and priorities between the request of the user and a vehicle function according to a request of the infotainment system.

8. The voice recognition function link control system according to claim 7, wherein the smart speaker is mounted in one of a driver's seat of front seats of the vehicle, a passenger seat of the front seats, a left seat of rear seats or a right seat of the rear seats using reflected sound of an audio signal output for a predetermined time through first to fourth speakers respectively mounted in the front and rear seats of the vehicle.

9. A voice recognition function link control method of a vehicle, comprising:
   uttering, by a user located inside the vehicle, a predetermined specific wakeup command and requesting, by the user, a specific content or a communication or optional service;
   determining whether the smart speaker is located in a front or rear seat of the vehicle through reflected sound of an audio signal output for a predetermine time;
   determining whether a current mode of the infotainment system is a navigation mode, a media mode, or a call mode when the smart speaker is located in the front seat of the vehicle;
   determining whether one of a plurality of general speakers respectively mounted in the front and rear seats of the vehicle is playable upon determining that the infotainment system is in any one of the navigation mode, the media mode, or the call mode; and
   extracting, by the smart speaker, an uttered voice of the user for a request when any one of the plurality of general speakers is playable.

10. The voice recognition function link control method of claim 9, further comprising:
   determining whether the smart speaker is located in a left or right seat of rear seats of the vehicle upon determining that the smart speaker is located in the rear seats of the vehicle; and
   the smart speaker determining a current sound feedback mode when the smart speaker is located at the left or right seat of the rear seats.

11. A non-transitory computer readable recording medium having recorded thereon a program for executing the method according to claim 9.

* * * * *